(12) United States Patent
Zaiser et al.

(10) Patent No.: US 10,220,371 B2
(45) Date of Patent: Mar. 5, 2019

(54) MOLECULAR SIEVE DEPRESSURIZATION SYSTEM UTILIZING A LOW PRESSURE INDUCTOR TYPE VAPOR CONDENSER

(71) Applicant: Hydro-Thermal Corporation, Waukesha, WI (US)

(72) Inventors: James Zaiser, Elm Grove, WI (US); Scott Lucas, DeSoto, KS (US)

(73) Assignee: Hydro-Thermal Corporation, Waukesha, WI (US)

( * ) Notice: Subject to any disclaimer, the term of this patent is extended or adjusted under 35 U.S.C. 154(b) by 219 days.

(21) Appl. No.: 15/289,248

(22) Filed: Oct. 10, 2016

(65) Prior Publication Data

US 2017/0100705 A1    Apr. 13, 2017

Related U.S. Application Data

(60) Provisional application No. 62/238,978, filed on Oct. 8, 2015.

(51) Int. Cl.
| | | |
|---|---|---|
| *B01J 20/34* | (2006.01) | |
| *B01D 53/26* | (2006.01) | |
| *B01D 3/00* | (2006.01) | |
| *B01D 3/14* | (2006.01) | |
| *B01J 38/02* | (2006.01) | |

(52) U.S. Cl.
CPC .......... *B01J 20/3491* (2013.01); *B01D 3/002* (2013.01); *B01D 3/145* (2013.01); *B01D 3/148* (2013.01); *B01D 53/261* (2013.01); *B01D 2253/116* (2013.01); *B01D 2257/80* (2013.01); *B01J 38/02* (2013.01)

(58) Field of Classification Search
CPC .......... B01D 3/002; B01D 3/14; B01D 3/145; B01D 3/148; B01D 53/0438; B01D 53/261; B01D 2253/116; B01D 2257/80; B01J 20/3491; B01J 38/02

See application file for complete search history.

(56) References Cited

U.S. PATENT DOCUMENTS 9,068,700 B2 * 6/2015 Sonnek ...................... F17D 1/16
2007/0088182 A1 * 4/2007 Hilaly ..................... B01D 15/00
568/916

FOREIGN PATENT DOCUMENTS

CA          1213617 A  * 11/1986  ............. C07C 29/76

* cited by examiner

*Primary Examiner* — Renee Robinson
*Assistant Examiner* — Gabriel E Gitman
(74) *Attorney, Agent, or Firm* — Andrus Intellectual Property Law, LLP

(57) ABSTRACT

A method and system of depressurizing a molecular sieve used in ethanol production is shown and described. The method and system utilizes a vapor mixing condenser that receives a vapor sieve feed from the molecular sieve during the depressurization cycle. The vapor from the molecular sieve during the pressurization cycle is used to heat the 190-proof product flow. The heated product flow is diverted directly to the 190-proof product vaporizer, which increases the input product flow temperature to the vaporizer, thereby reducing the amount of heat needed to vaporize the 190-proof product flow. The reduction in heat needed reduces energy costs and increases equipment life.

15 Claims, 2 Drawing Sheets

US 10,220,371 B2

MOLECULAR SIEVE DEPRESSURIZATION SYSTEM UTILIZING A LOW PRESSURE INDUCTOR TYPE VAPOR CONDENSER

CROSS-REFERENCE TO RELATED APPLICATION

The present application is based on and claims priority to U.S. Provisional Patent Application Ser. No. 62/238,978 filed Oct. 8, 2015.

BACKGROUND

The present disclosure generally relates to a system and method for depressurizing a molecular sieve. More specifically, the present disclosure relates to a method and system that utilizes a low pressure eductor type vapor condenser in the recycle stream from the molecular sieve.

Ethanol production has been the largest single application of corn processing since 1999, reflecting the recent high growth of the fuel ethanol market as an alternative fuel to gasoline. Ethanol is typically produced from corn through either a wet or dry milling process. In the wet milling process, the corn kernel is separated into its components including germ, fiber, protein and starch.

In a dry mill process, whole corn is ground into flour, treated with enzymes, chemically modified and cooked. The resulting "mash" is treated with enzymes to further break down the starchy endosperm tissue into glucose. The converted mash is fermented and distilled, producing ethanol, carbon dioxide, and distiller's grains with solubles ("DDG").

Within typical ethanol production facilities, a small percentage of water, typically 5% by volume, is present in the ethanol resulting in 190-proof ethanol. Current technology for ethanol production employs molecular sieves to remove the last approximately 5% of water from the product. A molecular sieve is typically a bottle containing ceramic beads or other media with an affinity for water. When the 190-proof ethanol passes through a molecular sieve, the molecular sieve pulls the last approximately 5% of water resulting in anhydrous ethanol, i.e. 200-proof, that can be blended with gasoline.

The process typically will heat 190-proof ethanol liquid in a heat-exchanger, called an economizer, and then pass the heated liquid into a vaporizer, which converts the liquid to vapor, which is then fed into one or more molecular sieves at a much higher pressure to produce 200-proof ethanol. However, after a sieve bottle is in production for a period of time, the media within the sieve becomes saturated and may start passing ethanol containing more moisture than is desired. At this point, the molecular sieve will be taken off line and put under deep vacuum conditions to regenerate the molecular sieve. The regeneration steps consist of a depressurization cycle and a deep vacuum cycle. Typically, the molecular sieve is depressurized back to the 190-proof condenser from the feed side of the bottle. This is referred to as reverse flow. The reverse flow stream then passes to the surge tank and is then pumped back as a reflux flow to the rectifier or back to the 190-proof storage tank to begin the process again through the economizer and vaporizer as a recycle stream, which will use additional energy before it is transformed into anhydrous ethanol.

Reverse flow systems for regenerating molecular sieves reduce plant capacity and consume additional energy. Because there is a large number of existing ethanol plants based on corn dry milling, and the number is increasing rapidly, it would be desirable to have a process that could be integrated into these plants to improve plant effectiveness and increase capacity with the least energy consumption. Further, steady flow conditions will minimize the negative effect of fusel release into the ethanol discharge.

SUMMARY

The present disclosure relates to a system and method for producing ethanol using a molecular sieve. More specifically, the present disclosure relates to a system and method for depressurizing the molecular sieve to recharge the dehydrating media within the molecular sieve.

The system of the present disclosure includes a rectifier that receives a supply of fermented mash and heats the fermented mash to create a vaporous 190-proof product stream and stillage. The 190-proof product stream includes an amount of water that must be removed to form the anhydrous ethanol.

The 190-proof product stream is received within a condenser that turns the vapor into a liquid 190-proof product stream. The liquid product stream is directed to a surge tank that stores the liquid product stream. The liquid product stream is drawn from the surge tank by a pump and stored in a larger storage tank. A portion of the liquid product stream from the surge tank is returned to the rectifier as a reflux flow and another portion is selectively directed to a condensing system that forms part of the present disclosure. The remaining portions of the liquid 190-proof product flow passes through a pre-heat economizer and is directed to a vaporizer.

The vaporizer receives the liquid 190-proof product stream and turns the product stream into a vapor sieve feed. The vapor sieve feed enters into an inlet end of the molecular sieve and passes over dehydrating media elements to remove water from the vapor sieve feed. During normal operation of the molecular sieve, anhydrous ethanol, which is defined as 99% ethanol by volume, is discharged from the molecular sieve at a discharge end of the sieve for final processing. The anhydrous ethanol is condensed, flashed to release carbon dioxide, passed through the economizer to remove heat from the liquid anhydrous ethanol and piped to a 200-proof storage tank.

When one or more columns of the molecular sieve become saturated, the columns can be recharged in accordance with the system and method of the present disclosure. Initially, one or more columns of the molecular sieve are moved off-line and the molecular sieve is depressurized. During this process, the inlet end of the molecular sieve is connected to the condensing system of the present disclosure. Specifically, the inlet end of the molecular sieve is connected to a vapor inlet of a mixing condenser. The vapor inlet receives a depressurization vapor sieve feed from the molecular sieve. The mixing condenser further includes a liquid inlet that receives at least a portion of the liquid 190-proof product stream that was stored in the surge tank. The liquid recharge flow is created by a mixing pump that draws the 190-proof product stream from the surge tank and directs the liquid recharge flow to the mixing condenser.

Since the vapor sieve feed from the molecular sieve is in a vapor form, the vapor is mixed with the liquid recharge flow to increase the temperature of the liquid recharge flow while at the same time condensing the vapor sieve feed. The resulting liquid recharge flow from the mixing condenser is received within a recharge surge tank for storage.

A recharge pump in provided to draw the liquid recharge flow from the recharge surge tank and provide the liquid recharge flow to the vaporizer. The temperature of the liquid recharge flow is above the temperature of the 190-proof liquid product flow, which increases the temperature of liquid entering into the vaporizer. In this manner, the vapor leaving the molecular sieve is able to increase the temperature of the 190-proof liquid product flow entering the vaporizer during the recharge and depressurization of the molecular sieve.

BRIEF DESCRIPTION OF THE DRAWINGS

The drawings illustrate the best mode presently contemplated of carrying out the disclosure. In the drawings.

DETAILED DESCRIPTION OF THE INVENTION

In a typical dry mill plant utilizing the dry mill process, the corn is delivered to the ethanol plant and loaded into storage bins. The grain is typically screened to remove debris and ground into course corn flour. The milled grain is mixed with water, pH adjusted and enzymes are added to produce a slurry. This slurry is heated to about 180-190 degrees F. to reduce viscosity through enzyme conversion. The slurry is then pumped through a jet cooker and subjected to approximately 221 degrees F. for 3-8 minutes. The mixture is then cooled by a vacuum flash condenser. After flash condensation cooling, enzymes are added and the mixture is held for a number of hours at about 180-190 degrees F. to give the enzyme sufficient time to break down the starch into short chain dextrins. Additional enzymes are added to break down the dextrins into simple sugars and the mixture is pumped into a fermentation tank where it is now referred to as mash. Yeast is added to convert the sugar to ethanol, carbon dioxide and solids. The carbon dioxide is typically captured and purified with a scrubber so it can be marketed to the food processing industry for use in carbonated beverages and flash-freezing applications.

Figure 1:
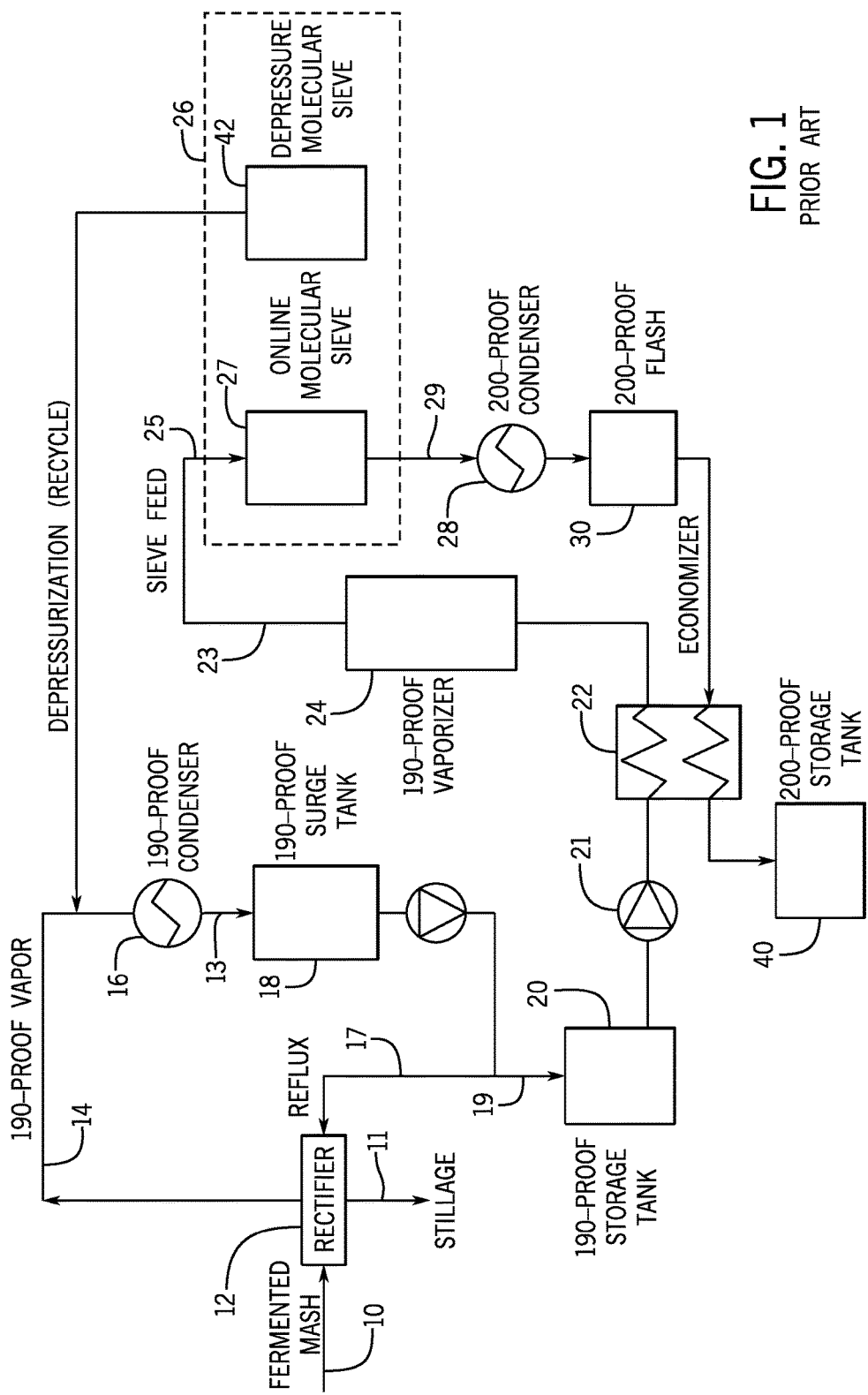
FIG. 1 is a circuit diagram illustrating a typical molecular sieve depressurization process.

Referring now to FIG. 1, the fermented mash 10 is pumped into a multi-column distillation rectifier 12 where additional heat is added. The rectifier 12 utilizes the differences in the boiling points of ethanol and water to boil off and separate the ethanol. When the vaporous product stream 14 leaves the distillation columns, it contains about 95% ethanol by volume (190-proof) and the remainder is 5% water by volume. The residue from the process, called stillage 11, contains non-fermentable solids and water and is pumped out from the bottom of the rectifier columns where it is further processed into DDG which is commonly used as a high-protein ingredient in cattle, swine, poultry, and fish food.

The vaporous 190-proof product stream 14 is then pumped into a condenser 16 where the vaporous product stream 14 is condensed to a liquid 190-proof product stream 13. The 190-proof liquid product stream 13 is then passed into a surge tank 18, which is a small tank that is designed to accommodate pressure changes in the system. The liquid product stream 13 is collected in the surge tank 18 and split between a reflux flow 17 (or recycle) returned to the rectifier 12 and a main product flow 19 directed to a storage tank 20. The storage tank 20 allows for process surges because the 190-proof product stream is going from a vapor to a liquid and back to a vapor again. A pump 21 directs the 190-proof liquid product stream through an economizer 22 that heats up the 190-proof liquid product stream. After passing through the economizer 22, the 190-proof liquid product stream is then pumped into vaporizer 24 which vaporizes or turns the warmed up liquid back into a vapor sieve feed 23.

The 190-proof vapor sieve feed 23 is fed into an input end 25 of the molecular sieve 26, which includes a plurality of molecular sieve columns. When the molecular sieve columns are online, as schematically shown by reference number 27, media elements within the molecular sieve physically separate the remaining water from the ethanol based on the different sizes of the respective molecules. This step produces 200-proof anhydrous ethanol vapor that exits the molecular sieve at the discharge end 29. The 200-proof anhydrous ethanol vapor leaving the molecular sieve 26 via the discharge end 28 is then passed through condenser 28 where it is turned again into a liquid. The 200-proof ethanol liquid product stream is then pumped through a flash tank 30 which allows the carbon dioxide to flash out of the liquid so it does not form carbonic acid in the fuel when later combined with gasoline.

The 200-proof liquid ethanol product stream is then pumped into the economizer 22, which functions as a heat recovery system that cools the 200-proof liquid by extracting heat from the liquid. The heat removed from the 200-proof liquid in the economizer 22 is routed to the 190-proof liquid product stream being pumped to the vaporizer 24, as previously described. A small amount of denaturant is added to the 200-proof liquid ethanol before it is sent to the storage tank 40, thereby making it unfit for human consumption. Storage tank 40 can typically hold seven to ten days production capacity.

Eventually, the molecular sieve 26 will pull enough water from the ethanol product stream that the media elements within the sieve 26 becomes saturated. In this case, either all or some of the molecular sieve columns of the molecular sieve 26 need to be taken off-line to recharge the media elements. In FIG. 1, reference numeral 42 refers to the molecular sieve 26 when it is being recharged while reference numeral 27 refers to the molecular sieve 26 when it is on-line. It should be understood that the reference numerals 27 and 42 refer to the same molecular sieve 26 and are used to differentiate between the on-line (27) and off-line (42) conditions.

In the depressurization or recycle process, one or more of the molecular sieve columns are taken off-line and the vapors from the off-line molecular sieve columns that contain water are depressurized back to condenser 16 from the input end of the molecular sieve 26. This is referred to as reverse flow. The reverse flow stream is then pumped back through the system to vaporizer 24 as a recycle stream, which will use additional energy for the vaporization and pumping of this ethanol.

Figure 2:
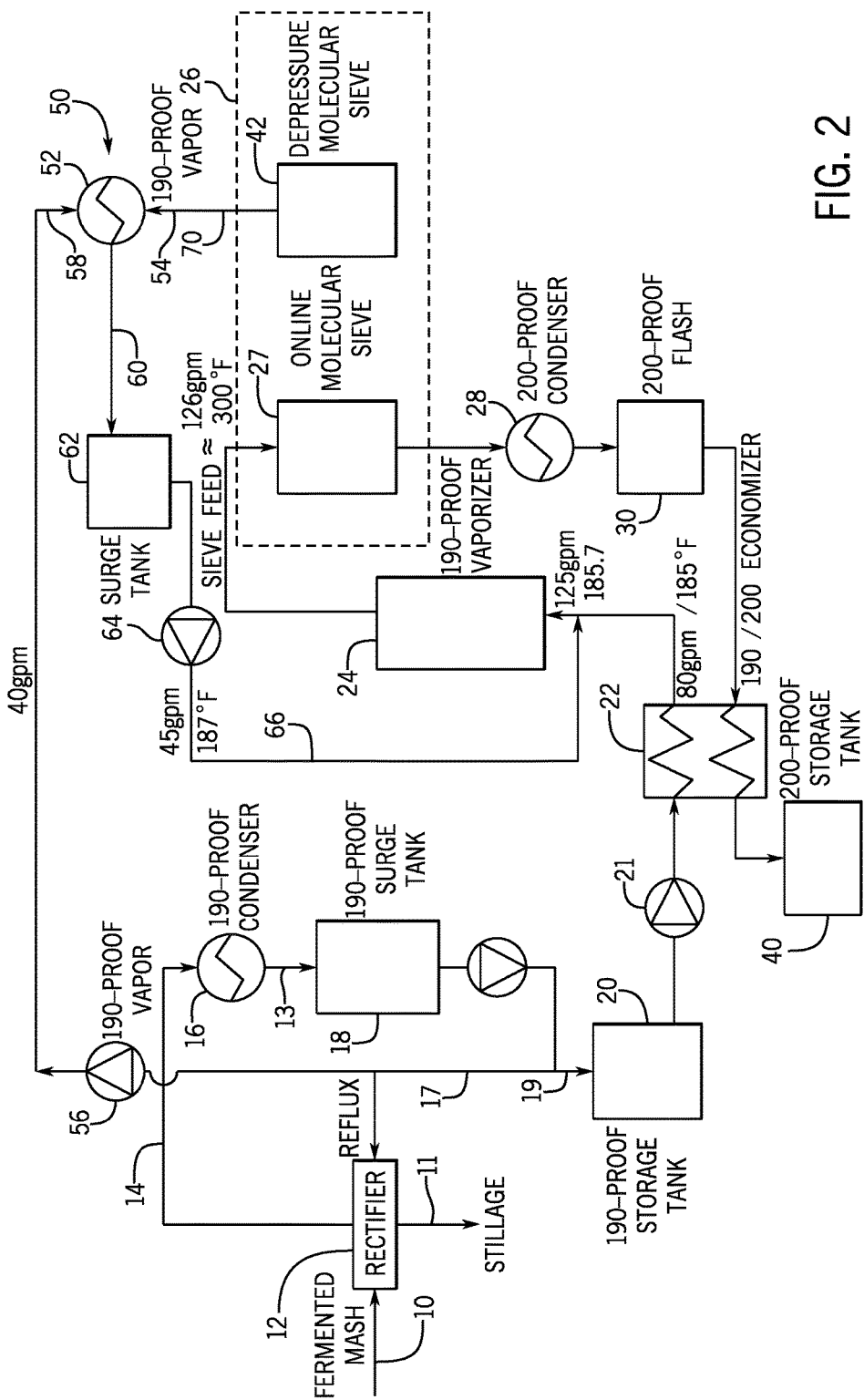
FIG. 2 is a circuit diagram illustrating the molecular sieve depressurization system and process utilizing an eductor type low pressure vapor condenser in accordance of the present disclosure.

The foregoing process has been vastly improved by the system and method in accordance with the present disclosure. Referring now to FIG. 2, like items also shown in FIG. 1 are indicated with like reference numerals. Fermented mash 10 is pumped into a multi-column distillation rectifier 12 where additional heat is added. The columns of the rectifier 12 utilize the differences in the boiling points of ethanol and water to boil off and separate the ethanol. When the vaporous 190-proof product stream 14 leaves the distillation columns, it contains about 95% ethanol by volume (190-proof) and the remainder is 5% water by volume.

As shown in FIG. 2, a condensing system 50 is added to the 190-proof feed system to utilize the heat contained within the vapors from the molecular sieve 26 when the molecular sieve 26 is off-line during depressurization to add additional heat to the 190-proof feed system. The condensing system 50 shown in FIG. 2 includes a low pressure eductor type vapor mixing condenser 52 that includes two inlets and mixes the inlet streams (one vapor, one liquid) to create an outlet stream. In the embodiment shown, the vapor mixing condenser 52 is a commercially available product referred to as a steam injection heater, such as the Hydro-heater® available from Hydro-Thermal Corporation. However, different devices could be used as the eductor type vapor mixing condenser 52 while operating within the scope of the present disclosure.

During the depressurization of the columns of the molecular sieve, as shown by reference number 42, the molecular sieve 26 is taken off-line and 190-proof vapor sieve feed from the off-line molecular sieve 42 is directed into a vapor inlet 54 of the vapor mixing condenser 52.

A mixing pump 56 is installed that will selectively divert a portion of the liquid 190-proof product stream from the surge tank 18 to the low pressure vapor mixing condenser 52 through a liquid inlet 58. In the embodiment illustrated, pump 56 will direct the product flow from the rectifier reflux 17 at a slip stream rate sufficient to accept the heat of the vapor sieve feed shown in the flow line 70 and received at the vapor inlet 54. This flow rate is intended to be the most at the start of the depressurization process and will reduce as the molecular sieve returns to atmospheric conditions. The flow rate may be up to 40 GPM into the liquid inlet 58 in the embodiment shown. Although flow rates are shown in FIG. 2 and described, it should be understood that the actual flow rates could change depending upon the size of the processing plant. The specified flow rates and temperature are for illustrative purposes only and are not meant to limit the scope of the present disclosure. The slip stream flow rate from the mixing pump 56 will be intermittent since the flow of depressurized vapors from the molecular sieve 42 will be cyclical. This flow may be generated from other cool 190-proof liquid sources within the reflux and storage process.

The output of the vapor condenser 52, shown by reference numeral 60 and referred to as a liquid recharge flow, is directed to a recharge surge tank 62. The level in the recharge surge tank 62 will fluctuate and a hot 190-proof liquid recharge flow 66 will be pumped out of the recharge surge tank 62 by recharge pump 64 intermittently and at variable rates. In the embodiment illustrated, the recharge pump 64 will pump at a rate of 45 GPM and the liquid recharge flow 66 from the recharge surge tank 62 will have a temperature of approximately 187° F. Again, this flow rate and temperature are for illustrative purposes only and are not meant to limit the disclosure. The recharge surge tank 62 includes a vent formed at an upper end such that incondensable gas, such as carbon dioxide, can be vented to atmosphere when the liquid recharge flow 66 is stored in the recharge surge tank 62.

The liquid recharge product flow in line 66 will be mixed with the 190-proof flow from the economizer 22. Typically, the 190-proof product flow from the economizer 22 is at a rate of 80 GPM such that the combined flow into the vaporizer 24 will be approximately 125 GPM. The system disclosed in FIG. 2 allows the combined flow rate of liquid into the vaporizer 24 to increase without increasing the demand on the pump 21. Since the pump 21 will often pump liquids over a long distance, the flow from the recharge pump 64 will allow pump 21 to operate at a point on the pump curve that can produce higher head. The reduction in the flow from the existing pump 21 will reduce pressure drop in the piping from the existing pump to the economizer 22.

As can be understood in FIG. 2, the vapor condenser 52 will increase economic performance by transferring heat from the 190-proof vapor sieve feed flow in line 70 during the depressurization of the molecular sieve, as shown by reference numeral 42. The heated liquid recharge flow in line 66 will be combined with the flow from the economizer 22 which will both increase the product temperature entering the vaporizer 24 as well as decrease the demands on the pump 21. According to calculations conducted, the reduction in the amount of heating needed in the vaporizer 24 could result in estimated savings of between $75,000-100,000 per year.

In addition to the advantages described above, there are also improvements in plant operation realized by diverting the depressurized sieve vapors in line 70 away from the condenser 16. For example, pressure fluctuations at the rectifier 12 will be reduced, which will allow for a more consistent operation and potential improvement in the 190-proof quality and fusel oil removal by eliminating flow variations and pressure spikes. These disturbances displace the fusels from their normal removal position. Diverting the depressurized vapors from the 190-proof condenser 16 will also extend the life of the 190-proof condenser 16, since the vapor flow from the depressurized molecular sieve 42 will enter the vapor condenser 52 rather than the condenser 16.

In addition to the advantages described above, the vapor leaving the molecular sieve and condensed is able to increase the temperature of the reduced amount of 190-proof liquid product flow through the economizer. A warmer inflow of product entering the vaporizer 24 results in less heating energy needed to generate vapors to feed the molecular sieve.

We claim:
1. A system for producing ethanol, comprising:
   a rectifier that receives a supply of fermented mash and heats the supply of fermented mash to create a vaporous 190-proof product stream and stillage;
   a condenser that receives the vaporous 190-proof product stream to create a liquid 190-proof product stream;
   a surge tank that receives and stores the liquid 190-proof product stream;
   a vaporizer that receives a first portion of the liquid 190-proof product stream and creates a vapor sieve feed;
   a molecular sieve having an input end to receive the vapor sieve feed, a media element to remove water from the vapor sieve feed and a discharge end for the discharge of anhydrous ethanol; and
   a condensing system operable to selectively recharge the molecular sieve, the condensing system including a mixing condenser that receives a depressurization vapor sieve feed from the inlet end of the molecular sieve and mixes the depressurization vapor sieve feed with at least a second, recharge portion of the liquid 190-proof product stream from the surge tank to create a liquid recharge flow;
   a recharge surge tank that receives and stores the liquid recharge flow from the mixing condenser; and
   a recharge pump operable to provide the liquid recharge flow from the recharge surge tank to the vaporizer such that the liquid recharge flow combines with the first portion of the liquid 190-proof product stream to feed the vaporizer during recharge of the molecular sieve.

2. The system of claim 1 wherein the condensing system further includes a mixing pump that pumps the second, recharge portion of the liquid 190-proof product stream from the surge tank to the mixing condenser.

3. The system of claim 2 wherein the flow rate from the recharge pump is greater than the flow rate from the mixing pump.

4. The system of claim 1 wherein the mixing condenser is a steam injection heater that receives the depressurization vapor sieve feed at a vapor inlet and the second, recharge portion of the liquid 190-proof product stream at a liquid inlet.

5. The system of claim 4 wherein the steam injection heater is adjustable to vary the mixing rate.

6. The system of claim 1, further comprising a vent located on a top portion of the recharge surge tank to remove gas from the stored liquid recharge flow.

7. A system for depressurizing a molecular sieve used in the production of ethanol, the molecular sieve including an inlet end that receives a vapor sieve feed from a vaporizer, dehydrating media to remove water from the vapor sieve feed and a discharge end to discharge anhydrous ethanol, the system comprising:
  a mixing condenser that receives a depressurization vapor sieve feed from the inlet end of the molecular sieve during depressurization of the molecular sieve and mixes the depressurization vapor sieve feed with a recharge portion of a liquid 190-proof product stream to create a liquid recharge flow;
  a recharge surge tank that receives and stores the liquid recharge flow from the mixing condenser; and
  a recharge pump operable to provide the liquid recharge flow from the recharge surge tank to the vaporizer such that the liquid recharge flow combines with a first portion of the liquid 190-proof product stream to feed the vaporizer during recharge of the molecular sieve.

8. The system of claim 7 wherein the condensing system further includes a mixing pump that pumps the recharge portion of the liquid 190-proof product stream from a surge tank to the mixing condenser.

9. The system of claim 8 wherein the flow rate from the recharge pump is greater than the flow rate from the mixing pump.

10. The system of claim 7 wherein the mixing condenser is a steam injection heater that receives the depressurization vapor sieve feed at a vapor inlet and the recharge portion of the liquid 190-proof product stream at a liquid inlet.

11. The system of claim 10 wherein the steam injection heater is adjustable to vary the mixing rate.

12. The system of claim 7, further comprising a vent located on a top portion of the recharge surge tank to remove gas from the stored liquid recharge flow.

13. A method of depressurizing a molecular sieve used in the production of ethanol, the molecular sieve including a plurality of on-line molecular sieve columns each having an inlet end that receives a vapor sieve feed from a vaporizer, dehydrating media to remove water from the vapor sieve feed and a discharge end to discharge anhydrous ethanol, the method comprising the steps of:
  taking at least one of the molecular sieve columns off-line to depressurize the molecular sieve column and recharge the dehydrating media;
  directing a depressurization vapor sieve feed from the inlet end of the molecular sieve column to a mixing condenser during depressurization of the molecular sieve column;
  mixing the depressurization vapor sieve feed with recharge portion of a liquid 190-proof product stream within the mixing condenser to create a liquid recharge flow;
  receiving the liquid recharge flow in a recharge surge tank;
  storing the liquid recharge flow from the mixing condenser in the recharge surge tank; and
  operating a recharge pump operable to provide the liquid recharge flow from the recharge surge tank to the vaporizer such that the liquid recharge flow combines with a first portion of the liquid 190-proof product stream to feed the vaporizer during recharge of the molecular sieve column.

14. The method of claim 13 wherein the mixing condenser is a steam injection heater that receives the depressurization vapor sieve feed at a vapor inlet and the recharge portion of the liquid 190-proof product stream at a liquid inlet.

15. The method of claim 14 further comprising the step of operating a mixing pump to pump the at least a portion of the liquid 190-proof product stream to the mixing condenser.

* * * * *